United States Patent Office 3,494,828
Patented Feb. 10, 1970

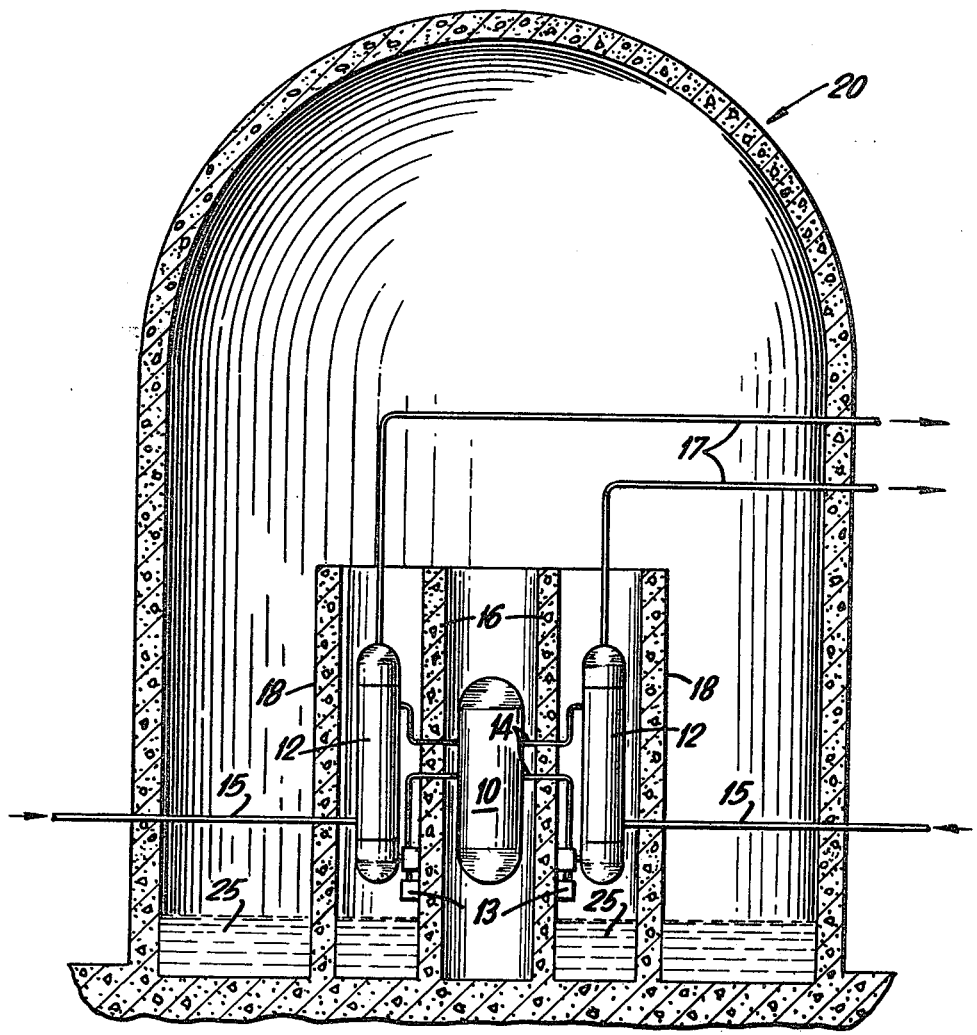

3,494,828
NUCLEAR REACTOR DIRECT PRESSURE
SUPPRESSION CONTAINMENT
Charles T. Chave, Wellesley, Mass., assignor to Stone & Webster Engineering Corporation, Boston, Mass., a corporation of Massachusetts
Continuation-in-part of application Ser. No. 564,647, July 12, 1966. This application Dec. 18, 1967, Ser. No. 691,625
Int. Cl. G21c 15/18
U.S. Cl. 176—38        4 Claims

ABSTRACT OF THE DISCLOSURE

Direct pressure suppression in a nuclear reactor containment structure is achieved by providing a liquid reservoir of predetermined volume and specific gravity established at a point which is less than that of water so that steam condensing at the surface will sink into the reservoir. The sinking condensate causes circulation within the reservoir, enabling the reservoir to continually absorb steam until thermal equilibrium is reached. The liquid reservoir is preferably comprised of water diluted with either a fluid or particulate solid material so as to be in the form of either a solution, emulsion or solid-water suspension. Also preferably, the fluid additive material is selected so as to have a low vapor pressure to minimize the amount of vaporization generated upon steam condensation.

BACKGROUND AND OBJECTS OF THE INVENTION

This application is a continuation-in-part of application S.N. 564,647, filed July 12, 1966, now Patent No. 3,414,472.

The present invention relates generally to nuclear reactor containment structures, and relates more particularly to a new and improved method and apparatus for obtaining pressure suppression in such containment structures for water-cooled reactors in the event of a nuclear incident.

It is desirable to enclose the reactor system of a water-cooled nuclear reactor within a secondary containment structure so as to prevent the escape of radioactive gases released by melt down or disruption of the reactor core to the surrounding environment. The containment structure must be designed to withstand the maximum pressure which might be attained in the event of an accident with a particular reactor. For example, rupture of the coolant line of a water reactor system would result in the instant vaporization of the water, and an immediate pressure build-up within the containment vessel.

Due to the high cost of constructing a containment vessel at the acceptable design pressures, proposals have been made for decreasing the pressure which has to be contained. One such proposal is the "pressure suppression" technique, whereby the steam or steam-water mixture emitted upon a leak or rupture in the reactor vessel in condensed in a pool of liquid surrounding the reactor vessel. However, prior proposals for achieving pressure suppression have required that the vapor be introduced below the surface of the liquid whereupon the vapor condenses as it rises to the liquid surface. This is disadvantageous in that it requires that the reactor vessel be constructed with a venting arrangement, such as a series of vent pipes, adding considerably to the reactor vessel cost. A more serious disadvantage of the venting scheme, however, is that, if the dry well or pressurized envelope about the reactor vessel ruptures, the entire pressure suppression system becomes ineffective. Further, in order to trap non-condensible gases and solid particulate matter as they rise through the liquid, it is necessary to construct complicated baffle arrangements within the pool.

It is therefore an object of this invention to provide a novel method and apparatus for achieving pressure suppression in a nuclear reactor containment structure in the event of a vapor or steam-producing reactor accident.

Another object of this invention is to provide a novel method of achieving pressure suppression which permits the use of a simplified and more economical nuclear reactor containment structure.

Another object of this invention is to obtain direct pressure suppression in a reactor containment vessel.

Another object of this invention is to provide an improved nuclear reactor containment apparatus, which is capable of preventing any substantial build-up of vapor pressure upon a nuclear accident, and which permits a simpler and more economical reactor vessel construction.

Another object of this invention is to provide a novel method and apparatus for achieving pressure suppression in a nuclear reactor containment structure which eliminates the need for venting flashed steam below the surface of the liquid reservoir.

Another object of this invention is to provide a novel method and apparatus for achieving pressure suppression in a nuclear reactor containment structure which includes a liquid reservoir in which the specific gravity is established at a point less than that for water.

Another object of this invention is to provide an improved pressure suppression method and apparatus which eliminates the disadvantages of previously known pressure suppression techniques and apparatus.

Objects and advantages of the invention are set forth in part herein and in part will be obvious herefrom, or may be learned by practice with the invention, the same being realized and attained by means of the steps, process, compositions, instrumentalities and combinations pointed out in the appended claims.

The invention consists in the novel steps, process, compositions, parts, constructions, arrangements, combinations and improvements herein shown and described.

SUMMARY OF THE INVENTION

Briefly described, the present invention is embodied in a novel and improved method and apparatus for achieving pressure suppression in a nuclear reactor containment structure. In a preferred embodiment, there is provided an inner shield wall forming a chamber in which the reactor vessel is mounted, an outer shield wall surrounding and spaced apart from the inner shield wall, the associated coolant equipment for the reactor being located in the space between the inner and outer shield walls and suitably interconnected with the reactor vessel, a containment vessel housing the reactor components and in spaced relation thereto, and a liquid reservoir of predetermined volume and specific gravity positioned in the space between the inner and outer shield walls and in the space between the outer shield wall and the containment vessel. The liquid reservoir is preferably comprised of water diluted with either a fluid or particulate solid material so as to be in the form of either a solution, emulsion or solid-water suspension. In an alternate embodiment, the reservoir is formed as a suspension of ice particles and water.

The specific gravity of the liquid reservoir is established at a point which is less than that of water so that steam condensing at the surface will sink into the reservoir. The sinking condensate causes circulation within the reservoir since the liquid in the reservoir has a lower specific gravity than water, enabling the reservoir to continually absorb steam until thermal equilibrium is reached. The material to be added to the water to form the liquid reservoir is also preferably selected so as to have a low vapor pressure to thereby minimize the amount of vaporization generated upon steam condensation.

By the method and apparatus of the invention, it therefore is not necessary to introduce the steam below the surface of the liquid reservoir, thereby eliminating the necessity for a complex venting arrangement. The continuous condensation and absorption of steam at the liquid surface provides direct pressure suppression and substantially eliminates the danger of leaks or ruptures in the reactor vessel or coolant system of a water-cooled nuclear reactor.

It will be understood that the foregoing general description and the following detailed description as well are exemplary and explanatory of the invention but are not restrictive thereof. Thus, while the invention is described in the environment of a pressurized-water reactor, the principles underlying the operation of the invention are equally applicable to other water-cooled reactors as, for example, boiling water reactors.

The accompanying drawing, referred to herein and constituting a part hereof, illustrates one embodiment of the apparatus of the invention, and together with the description, serves to explain the principles of the invention.

BRIEF DESCRIPTION OF THE DRAWING

Of the drawing:
The figure shown is a fragmentary view, partly sectional and partly schematic, of a pressurized-water nuclear reactor, its associated coolant equipment, and a containment structure, illustrating an embodiment of the apparatus of the invention.

DESCRIPTION OF THE PREFERRED EMBODIMENTS

Referring now more particularly to the drawing, there is illustrated, in a schematic fashion, a pressurized-water reactor 10, its associated coolant equipment such as steam generators 12, pumps 13 and connecting piping 14, water coolant make-up inlet lines 15 and steam outlet lines 17.

Reactor vessel 10 is suitably mounted and supported within an inner cylindrical shield wall 16 while the coolant equipment is suitably mounted and supported outside the wall 16 and preferably above the level of liquid reservoir 25, more fully described hereinbelow. An outer shield wall 18 surrounds the coolant equipment and shield 16 and thereby provides a convenient crane support, in addition to its shielding function. Wall 18 is not, however, essential to a successful operation of the invention and, if desired, may be eliminated.

Surrounding and spaced apart from outer shield wall 18, or wall 16 if wall 18 is not used, is an outer or secondary containment vessel 20, designed to contain the maximum pressure which might be attained by flashed steam as a result of a rupture in the reactor vessel 10 or its associated coolant piping.

It will be understood that the inner shield walls and outer containment may be constructed of either steel, ordinary concrete, high density concrete or a combination thereof, the criteria for selecting same being well known in the reactor technology art. It will be further understood that while the drawing illustrates only the reactor vessel and primary coolant system housed within containment vessel 20, there may also be enclosed therewithin the electrical generating equipment, condensers, etc. required for the complete power system.

In accordance with the invention, means is provided for obtaining direct pressure suppression of flashed steam which would be emitted into containment vessel 20 as a result of a rupture or leak in the reactor vessel 10 or its associated coolant piping.

As here embodied, this means comprises a liquid reservoir 25, formed in the space between shield walls 16 and 18, and in the space between outer shield wall 18 and the containment vessel 20, reservoir 25 having a lower specific gravity than water so as to provide a heat sink capable of continuously absorbing the steam condensate at the surface thereof until thermal equilibrium is reached. It has been found that as steam or vapor condenses upon contacting relatively cold water, a hot layer of condensate accumulates on the surface of the water and further condensation is thereafter substantially prevented. By providing the liquid in reservoir 25 at a lower specific gravity than water, steam condensation is continuous and the formation of a layer of condensate may be completely eliminated.

Reservoir 25 is preferably formed by combining either a fluid or particulate solid material with water so as to form a water-based solution, emulsion or colloidal suspension. While the invention includes the use of pure liquids in reservoir 25 of lower specific gravity than water, a water-base solution is preferred due to the ease of steam condensation in water and also for reasons of economy.

It has been found that a water-base liquid reservoir having the desired properties may suitably be established in any one of the following exemplary ways: (1) by forming a solution of water and an organic solute; (2) by forming a stable colloidal suspension of a solid in water; or (3) by forming a stable emulsion of fluid and water. In each case, the material to be added to the water is selected on the basis of low specific gravity and low vapor pressure, so that in the final mixture, the specific gravity will be lower than that for pure water and the emission of vapors from the additive material will be minimized. Thus, in the second-mentioned example, no vapors will be evolved from the solid suspended in the water. In the other examples, the boiling point of the additive material may be as low as 75° C. (atm.) and yet result in satisfactory operation. However, an additive material having a boiling point at 120° C., or greater, is preferred.

In connection with the first-mentioned example for establishing liquid reservoir 25 at a specific gravity less than that for pure water, it has been found that a satisfactory solution is formed by dissolving isopropyl alcohol, having a specific gravity of 0.7863 (20/20° C.) and a boiling point at 82.5° C. in water. The specific gravities of various isopropyl alcohol and water solutions at various temperatures are given in the following Table I. Each of the solutions in Table I has a specific gravity lower than that for pure water. As more fully explained hereinbelow, selection of a particular solution will depend primarily on the volume of the reservoir and the amount of pressure suppression required.

TABLE I.—SPECIFIC GRAVITY ISOPROPYL ALCOHOL, WATER SOLUTIONS

|  | 0° C. | 15° C. | 20° C. | 30° C. |
|---|---|---|---|---|
| Wt. percent in water: |  |  |  |  |
| 2 | 0.9962 | 0.9956 | 0.9944 | 0.9921 |
| 5 | 0.9916 | 0.9906 | 0.9893 | 0.9871 |
| 10 | 0.9856 | 0.9838 | 0.9820 | 0.9794 |

Another satisfactory solution may be formed by dissolving in water an ethylene glycol monobutyl ether, such as that sold under the trademark "butyl Cellosolve" by Union Carbide & Carbon Corp., [$C_4HO(CH_2)_2OH$], having a specific gravity of 0.9019 (20/20° C.) and a boiling point at 171.2° C. The specific gravities of various butyl Cellosolve-water solutions at various temperatures are given in the following Table II. Again, selection of a particular solution will depend on the factors previously mentioned and more fully explained hereinbelow.

TABLE II.—SPECIFIC GRAVITY (CALCULATED) BUTYL CELLOSOLVE, WATER SOLUTIONS

|  | 0° C. | 15° C. | 20° C. | 30° C. | 50° C. |
|---|---|---|---|---|---|
| Vol. percent in water: |  |  |  |  |  |
| 2 | 0.9982 | 0.9971 | 0.9961 | 0.9936 | 0.9859 |
| 5 | 0.9958 | 0.9944 | 0.9932 | 0.9906 | 0.9825 |
| 10 | 0.9916 | 0.9897 | 0.9884 | 0.9854 | 0.9770 |

Other suitable exemplary organic solutes which may be dissolved in water to establish a liquid reservoir according to the invention are listed in the following Table III, together with their specific gravities and vapor pressures:

TABLE III

| Name: | Formula | Specific gravity, 20/20, ° C. | Boiling point, ° C. |
|---|---|---|---|
| Ethanol | $CH_3CH_2OH$ | 0.789 | 78.4 |
| Allyl alcohol | $CH_2CHCH_2OH$ | 0.854 | 96.6 |
| Amylamine | $CH_3(CH_2)_4NH_2$ | 0.763 | 104 |
| Benzylamine | $C_6H_5CH_2NH_2$ | 0.982 | 184.5 |
| Carbitol | $C_2H_5O(CH_2)_2O(CH_2)_2OH$ | 0.990 | 201.9 |
| Methyl Cellosolve | $CH_3OCH_2CH_2OH$ | 0.965 | 124 |
| Cellosolve | $C_2H_5O(CH_2)_2OH$ | 0.931 | 135.1 |
| Propionic acid | $CH_3CH_2COOH$ | 0.992 | 141.1 |

In connection with the second-mentioned example for establishing the liquid reservoir at a specific gravity less than that for pure water, this is conveniently done by suspending a solid in water. The solid matter is preferably ground into a fine, particulate form and is of sufficient buoyancy so that a stable colloidal suspension is obtained. Suitable solid materials which meet these requirements are cork, micro-spheres, plastic and fatty materials. Of course, in a reservoir formed in this manner, no vapors are evolved from the solid matter in suspension.

In connection with the third-mentioned example for establishing the liquid reservoir at a specific gravity less than that for pure water, in this example, a stable emulsion is formed, comprised of water and a fluid less dense than water. Examples of such suitable fluids are the various cutting oils, mineral oils and fatty oils. Selection of a particular oil, or mixture of oils, and its internal phase would be primarily on the basis of low vapor pressure.

It will be understood to those of ordinary skill in the art that all of the foregoing materials are intended to be exemplary only and that other equivalent materials may likewise be suitably employed for establishing reservoir 25 at a lower specific gravity than water.

It will also be understood that the initial specific gravity and the volume of liquid stored in reservoir 25 are determinative of the amount of stem which may be condensed, and, consequently, the amount of pressure which may be suppressed, before thermal equilibrium is reached. These quantities, of course, will vary, depending upon the particular reactor involved, the acceptable design pressure for the containment vessel, and the amount of pressure suppression desired. However, once the foregoing principles are understood, the determination of the particular specific gravity and liquid volume is within the ordinary skill of one in the art of reactor technology.

In the following set of exemplary calculations, which illustrate the foregoing, a solution of butyl Cellosolve and water is used to form the reservoir 25.

EXAMPLE I (1) For a flashed steam-air mixture in the containment vessel at 260° F., the steam vapor pressure is 35.4 p.s.i.a. For a total design pressure of 40 p.s.i. gage (54.7 p.s.i.a.), then the air partial pressure is 19.3 p.s.i.a.

(2) assuming the steam condensate is also at a temperature of 260° F., then its specific gravity=0.94. In order for the liquid reservoir to have a specific gravity at, for example, 98% of water, the specific gravity of the reservoir is then (0.94) (0.98) or 0.92. For a reservoir comprised of a butyl Cellosolve-water solution at a temperature of 25° C. (77° F.) this requires that the solution contain approximately 80% by volume, of butyl Cellosolve. Thus, the steam condensate sinks immediately upon its formation and the rate of condensation is limited substantially only by mass transfer factors.

EXAMPLE II (1) The foregoing example required that the reservoir contain a large percentage of butyl Cellosolve in order to achieve a specific gravity at room temperature lower than the specific gravity of the hot steam condensate. Such a large amount of low specific gravity solute may be uneconomical. Alternatively, a smaller amount of solute may be dissolved in the water even though this results in the reservoir having a specific gravity which is initially higher than that of the hot steam condensate. The process then requires that the steam condensate cool down until its specific gravity is greater than that of the solution in the reservoir before it will sink below the surface. The amount of solute selected depends upon the rate of steam condensation necessary for the process to continue effectively.

(2) Assuming the steam condensate is also at a temperature-steam condensate as in Example I, a reservoir having a specific gravity at 98% of water at 260° F. requires that the solution contain 12% by volume of butyl Cellosolve.

(3) For a containment vessel 135 feet in diameter and having an inner chamber 35 feet in diameter, the surface area of the liquid in the reservoir is 13,300 square feet. Assuming that heat is cooled in steam at a rate of 250,000,000 B.t.u./hr., then the condensing heat transfer rate is: 250,000,000÷13,300=18,900 B.t.u./hr. (sq. ft.).

(4) Conduction of the steam condensate through water is determined by the following formula:

$$q = \frac{(k)(A)(\Delta t)}{x}$$

where:

$q$=B.t.u./hr.
$A$=Area (sq. ft.)
$\Delta t$=Temperature differential
$x$=Thickness of layer
$K$=0.34 B.t.u./(hr.) (sq. ft.) (° F.)/ft.—thermal conductivity of water Solving for $x$, $$q = \frac{(0.34)(\Delta t)}{x}$$

$$18,900 = (0.34)\frac{(\Delta t)}{(x)}$$

$$x(\text{ft.}) = \frac{(0.34)(\Delta t)}{18,900}; \quad x(\text{inches}) = \frac{(0.34)(12)(\Delta t)}{18,900}$$

Therefore, $x(\text{in.}) = (0.000216)(\Delta t)$

Thus, if $\Delta t$=100° F., it is necessary to transmit the condensate through a 0.0216 in. layer of water. This layer is so thin that only minor disturbances will upset it and it would have substantially no effect on the rate of steam condensation. Its thickness is affected by surface tension, vessel configuration and molecular forces, but does not seem to be affected by the condensing rate.

In operation, upon a rupture or leak in reactor vessel 10 or its associated coolant piping, flashed steam or vapor initially fills a portion of the air space within containment vessel 20 until it reaches the surface of the liquid in reservoir 25. Upon contacting the relatively cool liquid surface, the steam condenses and the resulting condensate sinks into the liquid reservoir, either immediately, if the hot condensate has a higher specific gravity than the reservoir, or as soon as the condensate cools to a point where its specific gravity is higher than that of the reservoir. The sinking condensate displaces the liquid within the reservoir and forces it to the surface, since the liquid in the reservoir has a lower specific gravity than water. Thus, there is continuous circulation within the reservoir and continuous condensation and absorption of steam at the liquid surface until thermal equilibrium is reached.

In an alternate embodiment according to the invention, reservoir 25 is formed by floating ice particles, such as cubes, or the like, in ice water preferably at a temperature of approximately 32° F. This embodiment takes advantage of the well known physical phenomenon whereby water reaches its maximum density at about 40° F. and thereafter becomes less dense as the freezing point is approached. Upon reaching the freezing point, water is formed into ice, which has a density of about 90% of water at 40° F. and therefore floats in water.

It will be seen that the foregoing alternate embodiment of reservoir 25 operates similarly to the previously described embodiment in providing a heat sink capable of continuously absorbing the steam condensate at the surface of the reservoir until thermal equilibrium is reached. Thus, the partial pressure difference between the surface of the ice water and the interior of the containment vessel serves as the driving force to drive the steam to the ice water. As the hot steam condensate warms the ice water at the surface of the reservoir to a temperature above the freezing temperature, the warmed water becomes denser than the body of ice water in the reservoir and sinks into the reservoir. Hence, the ice water in the reservoir, having a lower specific gravity than the water warmed by the steam condensate, is forced to the surface whereby condensation and absorption of steam at the surface of the reservoir is continuous until thermal equilibrium is reached.

It will further be seen that the principles of the foregoing alternate embodiment may advantageously be applied in floating ice particles in a solution of water and low vapor pressure organic solute, such as previously described, also preferably at a temperature of approximately 32° F. Thus, the water generated by the melting ice has a density of about 0.99–1.00, while the surrounding liquid has a somewhat lower density of approximately 0.92. Accordingly, condensation of steam produces water of higher density than that of the reservoir liquid, thereby insuring that the condensation process continues without intereference from a layer of hot condensate at the surface of the reservoir.

As in the case of the previously described embodiment, it will be understood that the volume of ice water and ice particles floating therein which comprise reservoir 25 are determinative of the amount of steam which may be condensed, and, consequently, the amount of pressure which may be suppressed, before thermal equilibrium is reached. These quantities, of course, will vary, depending upon the particular reactor involved, the acceptable design pressure for the containment vessel, and the amount of pressure suspension desired. However, once the foregoing principles are understood, the determination of the particular specific gravity and liquid volume is within the ordinary skill of one in the art of reactor technology.

From the foregoing description it will be seen that the objects of the invention have been accomplished. The invention achieves direct pressure suppression within a nuclear reactor containment vessel by continuously condensing and absorbing steam at the surface of the liquid reservoir. Hence the invention eliminates the need for a complex venting arrangement in the reactor vessel and further eliminates the need for a baffle arrangement within the liquid reservoir in order to trap noncondensible and solid particulate materials. There results a novel and improved nuclear reactor containment structure of simplified design and reduced cost.

The invention in its border aspects is not limited to the specific embodiment herein shown and described but departures may be made therefrom within the scope of the accompanying claims without departing from the principles of the invention and without sacrificing its chief advantages.

What is claimed is:

1. A method for obtaining pressure suppression in a nuclear reactor containment structure in the event of a steam-producing reactor accident comprising, providing a reservoir of water of a predetermined volume within the containment structure, establishing said water reservoir with a low vapor pressure and a specific gravity at a point lower than the specific gravity of water by floating ice particles therein which on melting produce water of an increased specific gravity, and contacting the steam produced upon a reactor accident with the surface of said reservoir to thereby condense the steam, whereby the steam condensate sinks and forces the water and ice particles within the reservoir to the surface thereof, so as to permit continuous condensation of steam at the surface of the reservoir.

2. A method as claimed in claim 1, wherein the temperature of said reservoir prior to the steam-producing reactor accident is approximately 32° F.

3. An apparatus for obtaining pressure suppression in a nuclear reactor containment structure comprising, an outer containment vessel housing a water-cooled reactor vessel and associated coolant equipment, said outer vessel surrounding and spaced apart from said reactor vessel and coolant equipment, a liquid reservoir disposed within said outer containment vessel, said reservoir comprising ice particles floating in water which on melting produce water of increased specific gravity, so that said reservoir has a low vapor pressure and a lower specific gravity than water, whereby upon a steam-producing reactor accident steam condenses at the surface of said reservoir and the steam condensate thereafter sinks into the reservoir, permitting continuous condensation of steam at the surface of said reservoir.

4. An apparatus as claimed in claim 3, wherein the temperature of said reservoir prior to said steam-producing reactor accident is approximately 32° F.

References Cited

UNITED STATES PATENTS

| | | | |
|---|---|---|---|
| 3,115,450 | 12/1963 | Schanz | 176—37 |
| 3,158,546 | 11/1964 | Cordova | 176—37 |

BENJAMIN R. PADGETT, Primary Examiner

H. E. BEHREND, Assistant Examiner

PO-1050
(5/69)

UNITED STATES PATENT OFFICE
CERTIFICATE OF CORRECTION

Patent No. 3,494,828  Dated  February 10, 1970

Inventor(s) Charles T. Chave

It is certified that error appears in the above-identified patent and that said Letters Patent are hereby corrected as shown below:

Column 1, lines 17-18, "establish at" should read --established at--. Column 4, line 61, $[C_4HO(CH_2)_2OH]$ should read --$[C_4H_9O(CH_2)_2OH]$. Column 5, line 46, "stem" should read --steam--. Column 6, lines 33-34, "Assuming the steam condensate is also at a tempera- steam condensate as in Example I," should read --Assuming the same temperature for the steam and steam condensate as in Example I,--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents